United States Patent
Chen et al.

(10) Patent No.: US 12,468,887 B1
(45) Date of Patent: Nov. 11, 2025

(54) MACHINE LEARNING-BASED METAPHOR DETECTION

(71) Applicant: Educational Testing Service, Prineton, NJ (US)

(72) Inventors: Xianyang Chen, Princeton, NJ (US); Chee Wee Leong, Pennington, NJ (US); Michael Flor, Lawrence Township, NJ (US); Beata Beigman Klebanov, Hopewell, NJ (US)

(73) Assignee: Educational Testing Service, Princeton, NJ (US)

( * ) Notice: Subject to any disclaimer, the term of this patent is extended or adjusted under 35 U.S.C. 154(b) by 651 days.

(21) Appl. No.: 17/238,766

(22) Filed: Apr. 23, 2021

Related U.S. Application Data

(60) Provisional application No. 63/014,732, filed on Apr. 24, 2020.

(51) Int. Cl.
*G06F 40/284* (2020.01)
*G06N 20/00* (2019.01)

(52) U.S. Cl.
CPC .......... *G06F 40/284* (2020.01); *G06N 20/00* (2019.01)

(58) Field of Classification Search
CPC .............................. G06F 40/284; G06N 20/00
See application file for complete search history.

(56) References Cited

U.S. PATENT DOCUMENTS

| | | | | |
|---|---|---|---|---|
| 2005/0273357 A1* | 12/2005 | Barnes | ............... | G06Q 10/0635 705/7.29 |
| 2012/0004802 A1* | 1/2012 | Horvitz | .................. | G06N 20/00 706/57 |
| 2012/0174121 A1* | 7/2012 | Treat | ....................... | G06F 9/542 719/318 |
| 2012/0290950 A1* | 11/2012 | Rapaport | ............ | H04L 12/1818 715/753 |
| 2014/0101089 A1* | 4/2014 | Egan | ....................... | G06N 5/025 706/47 |
| 2014/0278367 A1* | 9/2014 | Markman | ............. | G06F 40/253 704/9 |
| 2019/0122101 A1* | 4/2019 | Lei | ......................... | G06N 3/044 |
| 2019/0220773 A1* | 7/2019 | Terry | ....................... | G06N 5/02 |
| 2019/0236464 A1* | 8/2019 | Feinson | ................. | G06N 3/006 |
| 2020/0066267 A1* | 2/2020 | Ortiz, Jr. | ................. | G10L 15/22 |
| 2020/0265188 A1* | 8/2020 | Nahamoo | ............... | G06F 16/93 |

(Continued)

OTHER PUBLICATIONS

Beigman Klebanov, Beata, Diermeier, Daniel, Beigman, Eyal; Lexical Cohesion Analysis of Political Speech; Political Analysis, 16(4); pp. 447-463; 2008.

(Continued)

*Primary Examiner* — Michael N Opsasnick
(74) *Attorney, Agent, or Firm* — Jones Day

(57) ABSTRACT

Data is received that includes a passage of text. The passage of text can be tokenized so that features can be extracted from the resulting tokens. One or more machine learning models can detect one or more metaphors within the passage of text using the extracted features. The at least one machine learning model can be trained, for example, by interleaving data relating to metaphors with data relating to one or more auxiliary tasks associated with related figurative language constructs. Data can then be provided that identifies the detected metaphors. Related apparatus, systems, techniques and articles are also described.

19 Claims, 4 Drawing Sheets

(56) References Cited

U.S. PATENT DOCUMENTS

2021/0149625 A1* 5/2021 Mays, III ............... G06F 3/0486
2021/0271822 A1* 9/2021 Bui ....................... G06F 40/205

OTHER PUBLICATIONS

Beigman Klebanov, Beata, Flor, Michael; Argumentation-Relevant Metaphors in Test-Taker Essays; Proceedings of the 1st Workshop on Metaphor in NLP; pp. 11-20; Jun. 2013.
Beigman Klebanov, Beata, Leong, Chee Wee, Flor, Michael; A Corpus of Non-Native Written English Annotated for Metaphor; Proceedings of the NAACL-HLT; New Orleans, LA; pp. 86-91; Jun. 2018.
Beigman Klebanov, Beata, Leong, Chee Wee, Gutierrez, Elkin Dario, Shutova, Ekaterina, Flor, Michael; Semantic Classification for Detection of Verb Metaphors; Proceedings of the 54th Annual Meeting of the Association for Computational Linguistics; Berlin, Germany; pp. 101-106; Aug. 2016.
Billow, Richard, Rossman, Jeffrey, Lewis, Nona, Goldman, Deberah, Raps, Charles; Observing Expressive and Deviant Language in Schizophrenia; Metaphor and Symbol, 12(3); pp. 205-216; Nov. 1997.
Bosman, Jan; Persuasive Effects of Political Metaphors; Metaphor and Symbolic Activity, 2(2); pp. 97-113; Nov. 2009.
Cameron, Lynne; Metaphor in Educational Discourse; Continuum: London, UK; 2003.
Dankers, Verna, Rei, Marek, Lewis, Martha, Shutova, Ekaterina; Modelling the Interplay of Metaphor and Emotion Through Multitask Learning; Proceedings of the 2019 Conference on Empirical Methods in Natural Language Processing and the 9th International Joint Conference on Natural Language Processing; Hong Kong, China; pp. 2218-2229; Nov. 2019.
Devlin, Jacob; Chang, Ming-Wei, Lee, Kenton, Toutanova, Kristina; Bert: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.
Flor, Michael, Beigman Klebanov, Beata; Catching Idiomatic Expressions in EFL Essays; Proceedings of the Workshop on Figurative Processing; New Orleans, LA; pp. 34-44; Jun. 2018.
Flor, Michael, Fried, Michael, Rozovskaya, Alla; A Benchmark Corpus of English Misspellings and a Minimally-Supervised Model for Spelling Correction; Proceedings of the 14th Workshop on Innovative Use of NLP for Building Educational Applications; Florence, Italy; pp. 76-86; Aug. 2019.
Flor, Michael, Futagi, Yoko, Lopez, Melissa, Mulholland, Matthew; Patterns of Misspellings in L2 and L1 English: a View from the ETS Spelling Corpus; Bergin Language and Linguistics Studies, 6; 2015.
Gibbs, Raymond, O'Brien, Jennifer; Idioms and Mental Imagery: The Metaphorical Motivation for Idiomatic Meaning; Cognition, 36(1); pp. 35-68; Jul. 1990.
Glucksberg, Sam; Understanding Figurative Language: From Metaphors to Idioms; Oxford Psychology Series, 36; Oxford University Press: Oxford, UK; 2001.
Granger, Sylviane, Wynne, Martin; Optimising Measures of Lexical Variation In EFL Learner Corpora; Corpora Galore; Rodopi: Amsterdam; pp. 249-257; Jan. 1999.
Gutierrez, Elkin Dario, Corlett, Philip, Corcoran, Cheryl, Cecchi, Guillermo; Using Automated Metaphor Identification to Aid in Detection and Prediction of First-Episode Schizophrenia; Proceedings of the 2017 Conference on Empirical Methods in Natural Language Processing; Copenhagen, Denmark; pp. 2923-2930; Sep. 2017.
Howard, Jeremy, Ruder, Sebastian; Universal Language Model Fine-Tuning for Text Classification; Proceedings of the 56th Annual Meeting of the Association for Computational Linguistics (Long Papers); Melbourne, Australia; pp. 328-339; Jul. 2018.
Gamberdiev, Timour, Shin, Hyopil; Metaphor Identification with Paragraph and Word Vectorization: An Attention-Based Neural Approach; 32nd Pacific Asia Conference on Language, Information and Computation; Hong Kong, China; pp. 212-221; Dec. 2018.
Kathpalia, Sujata, Carmel, Heah Lee Hah; Metaphorical Competence in ESL Student Writing; RELC Journal, 42 (3); pp. 273-290; 2011.
Kaviani, Hossein, Hamedi, Robabeh; A Quantitative/Qualitative Study on Metaphors Used by Persian Depressed Patients; Archives of Psychiatry and Psychotherapy, 4; pp. 5-13; 2011.
Lakoff, George; Moral Politics: How Liberals and Conservatives Think; University of Chicago Press; 2010.
Lakoff, George, Johnson, Mark; Metaphors We Live By; University of Chicago Press: Chicago, IL; 1980.
Landau, Mark, Sullivan, Daniel, Greenberg, Jeff; Evidence That Self-Relevant Motives and Metaphoric Framing Interact to Influence Political and Social Attitudes; Psychological Science, 20(11); pp. 1421-1427; 2009.
Leong, Chee Wee; Beigman Klebanov, Beata, Shutova, Ekaterina; A Report on the 2018 VUA Metaphor Detection Shared Task; Proceedings of the Workshop on Figurative Language Processing; New Orleans, LA; pp. 56-66; Jun. 2018.
Littlemore, Jeannette, Krennmayr, Tina, Turner, James, Turner, Sarah; An Investigation into Metaphor Use at Different Levels of Second Language Writing; Applied Linguistics, 35(2); pp. 117-144; May 2014.
Littlemore, Jeannette, Low, Graham; Metaphoric Competence, Second Language Learning, and Communicative anguage Ability; Applied Linguistics, 27(2); pp. 268-294; Jun. 2006.
Liu, Yinhan, Ott, Myle, Goyal, Naman, Du, Jingfei, Joshi, Mandar, Chen, Danqi, Levy, Omer, Lewis, Mike, Zettlemoyer, Luke, Stoyanov, Veselin; RoBERTa: A Robustly Optimized BERT Pretraining Approach; arXiv: 1907.11692; Jul. 2019.
Mao, Rui, Lin, Chenghua, Guerin, Frank; End-to-End Sequential Metaphor Identification Inspired by Linguistic Theories; Proceedings of the 57th Annual Meeting of the Association for Computational Linguistics; Florence, Italy; pp. 3888-3898; Jul. 2019.
Marhla, Joanna, Polak, Justyna, Janicka, Maria, Wawer, Aleksander; Recognizing Metaphor: How Do Non-Experts and Machines Deal with a Metaphor Identification Task?; Polish Cognitive Linguistics Association Conference 2019, Book of Abstracts; p. 72; Sep. 2019.
Markert, Katja; Literature List PS/HS SS2019 Figurative Language Resolution; Apr. 2019.
Mikhalkova, Elena, Ganzherli, Nadezhda, Maraev, Vladislav, Glazkova, Anna, Grigoriev, Dmitriy; A Comparison of Algorithms for Detection of "Figurativeness" in Metaphor, Irony and Puns; International Conference on Analysis of Images, Social Networks and Texts; pp. 186-192; 2019.
Nunberg, Geoffrey, Sag, Ivan, Wasow, Thomas; Idioms; Language, 70(3); pp. 491-538; Sep. 1994.
Pragglejaz Group; MIP: A Method for Identifying Metaphorically Used Words in Discourse; Metaphor and Symbol, 22(1); pp. 1-39; 2007.
Rajpurkar, Pranav, Zhang, Jian, Lopyrev, Konstantin, Liang, Percy; Squad: 100,000+ Questions for Machine Comprehension of Text; Proceedings of the Conference on Empirical Methods in Natural Language Processing; Austin, Texas; pp. 2383-2392; Nov. 2016.
Rozovskaya, Alla, Roth, Dan; Grammatical Error Correction: Machine Translation and Classifiers; Proceedings of the 54th Annual Meeting of the Association for Computational Linguistics; Berlin, Germany; pp. 2205-2215; Aug. 2016.
Saund, Carolyn, Roth, Marion, Chollet, Mathieu, Marsella, Stacy; Multiple Metaphors in Metaphoric Gesturing; 8th International Conference on Affective Computing and Intelligent Interaction; pp. 524-530; 2019.
Steen, Gerard, Dorst, Aletta, Herrmann, J. Berenike, Kaal, Anna, Krennmayr, Tina, Pasma, Trijntje; A Method for Linguistic Metaphor Identification; John Benjamins Publishing Company: Amsterdam; 2010.
Sun, Yu, Wang, Shuohuan, Li, Yukun, Feng, Shikun, Chen, Xuyi, Zhang, Han, Tian, Xin, Zhu, Danxiang, Tian, Hao, Wu, Hua; ERNIE: Enhanced Representation Through Knowledge Integration; arXIV:1904.09223; Apr. 2019.

(56) References Cited

OTHER PUBLICATIONS

Thibodeau, Paul, Boroditsky, Lera; Metaphors We Think With: The Role of Metaphor in Reasoning; PloS One, 6 (2):e16782; Feb. 2011.

Vaswani, Ashish, Shazeer, Noam, Parmar, Niki, Uszkoreit, Jakob, Jones, Llion, Gomez, Aidan, Kaiser, Lukasz, Polosukhin, Illia; Attention Is All You Need; 31st Conference on Neural Information Processing Systems; Long Beach, CA; pp. 5998-6008; 2017.

Veale, Tony, Shutova, Ekaterina, Beigman Klebanov, Beata; Metaphor: A Computational Perspective; Synthesis Lectures on Human Language Technologies, 9(1); pp. 1-160; Feb. 2016.

Wang, Alex, Singh, Amanpreet, Michael, Julian, Hill, Felix, Levy, Omer, Bowman, Samuel; Glue: A Multi-Task Benchmark and Analysis Platform for Natural Language Understanding; Proceedings of the 2017 EMNLP Workshop BlackboxNLP: Analyzing and Interpreting Neural Networks for NLP; Brussels, Belgium; pp. 353-355; Nov. 2018.

Yang, Zhilin, Dai, Zihang, Yang, Yiming, Carbonell, Jaime, Salakhutdinov, Ruslan, Le, Quoc; XLNet: Generalized Autoregressive Pretraining for Language Understanding; Advances in Neural Information Processing Systems; pp. 5754-5764; 2019.

Zaltman, Gerald, Zaltman, Lindsay; Marketing Metaphoria: What Deep Metaphors Reveal About the Minds of Consumers; Harvard Business Press; 2008.

Zellers, Rowan, Bisk, Yonatan, Schwartz, Roy, Choi, Yejin; SWAG: A Large-Scale Adversarial Dataset for Grounded Commonsense Inference; arXiv:1808.05326; Aug. 2018.

\* cited by examiner

MACHINE LEARNING-BASED METAPHOR DETECTION

RELATED APPLICATION

This application claims priority to U.S. Pat. App. Ser. No. 63/014,732 filed on Apr. 24, 2020, the contents of which are hereby fully incorporated by reference.

TECHNICAL FIELD

The subject matter described herein relates to metaphor detection using machine learning such as a multi-tasked transformer-based architecture.

BACKGROUND

Metaphors comprise an important component in human language in that metaphors provide a means to relate our experiences to other subjects and contexts. Metaphors, in particular, are commonly used to help one understand the world in a structured way, and oftentimes in an unconscious manner while one speaks and writes. Metaphors sheds light on the unknown using the known, explains the complex using the simple, and helps us to emphasize the relevant aspects of meaning resulting in effective communication. NLP techniques often have difficulty identifying or otherwise characterizing metaphors within text which, in turn, can negatively affect other computer-implemented processes consuming the output of such NLP techniques.

SUMMARY

In a first aspect, data is received that includes a passage of text. The passage of text can be tokenized so that features can be extracted from the resulting tokens. One or more machine learning models can detect one or more metaphors within the passage of text using the extracted features. The at least one machine learning model can be trained, for example, by interleaving data relating to metaphors with data relating to one or more auxiliary tasks associated with related figurative language constructs. Data can then be provided that identifies the detected metaphors.

The figurative language constructs can characterize one or more of: simile, metaphor, personification, onomatopoeia, oxymoron, hyperbole, allusion, idiom, imagery, symbolism, alliteration, assonance, consonance, metonymy, synecdoche, irony, sarcasm, litotes, pun, anaphora, tautology, or understatement.

The machine learning model(s) can be a transformer model that is pre-trained on a plurality of passages of text with marked metaphors. Various type of transformer models can be used including a bidirectional encoder representations from transformers (BERT) model.

Contextual embeddings of sentences forming part of the passages of text can be obtained. In addition, a linear layer can be applied on each token to predict whether it is metaphorical or not.

The machine learning model(s) can predict, for each token, whether it is part of a figurative language construct.

The provision of data can include one or more of: displaying the data identifying the detected metaphors in an electronic visual display, loading the data identifying the detected metaphors in memory, storing the data identifying the detected metaphors in physical persistence, or transmitting the data identifying the detected metaphors to a remote computing system.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides advanced computer-based speech and text recognition and characterization techniques as compared to conventional natural language processing techniques. In particular, the current subject matter provides for more accurate metaphor detection by using machine learning models trained using various auxiliary tasks associated with figurative language constructs.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
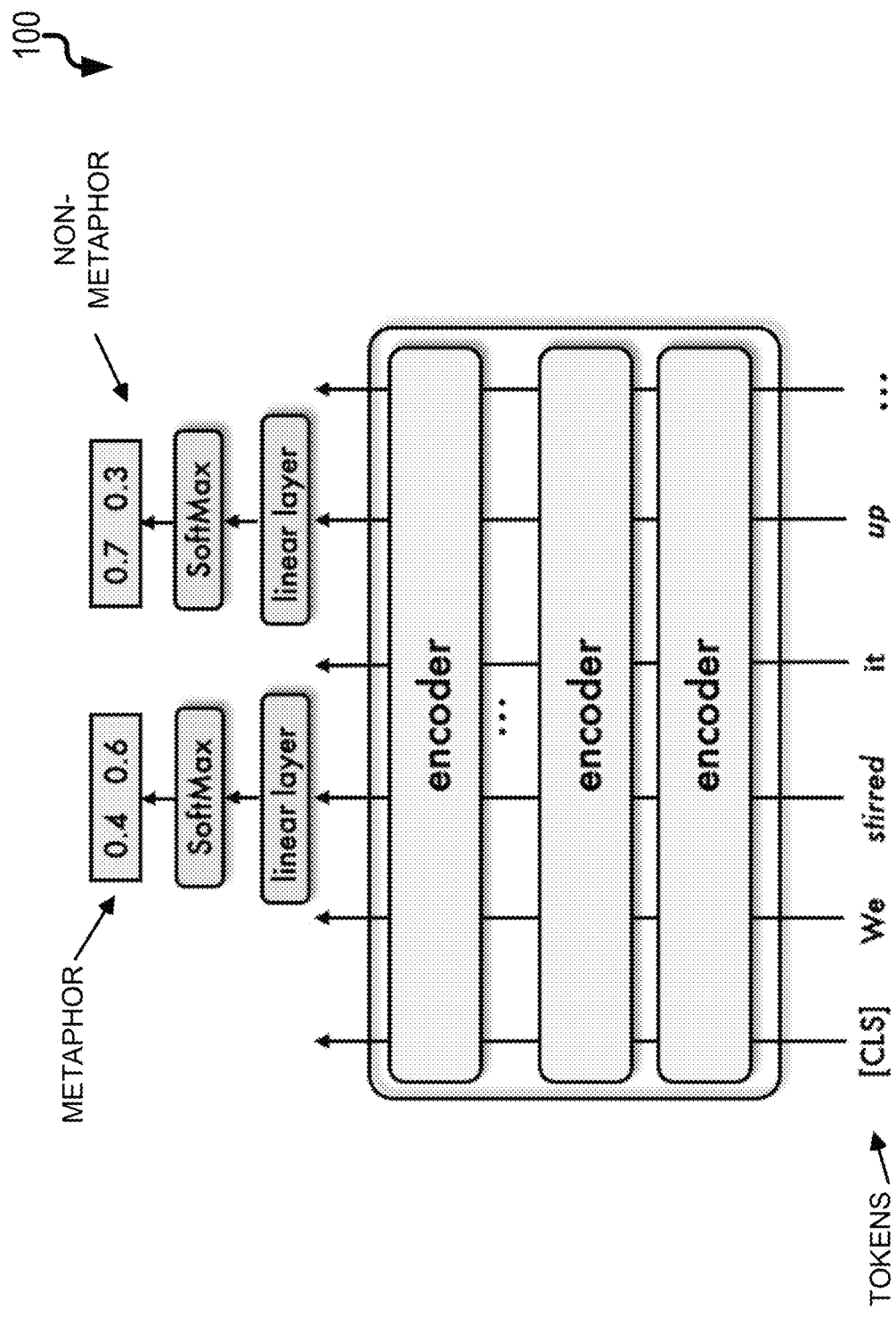
FIG. 1 is a diagram illustrating a transformer network architecture for implementing aspects of the current subject matter.

The current subject matter is computer-implemented techniques directed to the detection of metaphors within passages of text which use machine learning. While certain machine learning techniques/architectures such as a multi-tasked transformer-based network (in which a main task such as metaphor detection is scored and one or more complementary tasks (e.g., idiom detection) are scored) is described, it will be appreciated that other types of machine learning models can be used with the current teachings.

The current subject matter was validated through a sequence of experiments using a Bidirectional Encoder Representations from Transformers (BERT) (BERT) architecture, starting with a baseline, strengthening it by spell-correcting the TOEFL corpus, followed by a multi-task learning setting, where one of the tasks is the token-level metaphor classification (the main task), while the other is meant to provide additional training that was hypothesized to be relevant to the main task. In one case, out-of-domain data manually annotated for metaphor was used for the auxiliary task; in the other case, in-domain data automatically annotated for idioms was used for the auxiliary task.

The current subject matter was validated/developed using various datasets. A first dataset was the VU Amsterdam Metaphor Corpus (VUA) which consists of 117 fragments sampled across four genres from the British National Corpus: Academic, News, Conversation, and Fiction. With this dataset, each genre is represented by approximately the same number of tokens, although the number of texts differs greatly, where the news archive has the largest number of texts. The data is annotated using the MIP-VU procedure with a strong inter-annotator reliability of $\kappa > 0.8$. It is based on the MIP procedure extending it to handle metaphoricity through reference (such as marking did as a metaphor in As the weather broke up, so did their friendship) and allow for explicit coding of difficult cases where a group of annotators could not arrive at a consensus. Note that only considered words marked as metaphors were considered.

A second utilized dataset was the TOEFL corpus which comprises data labeled for metaphor that was sampled from the publicly available ETS Corpus of Non-Native Written English. The annotated data comprises essay responses to eight persuasive/argumentative prompts, for three native languages of the writer (Japanese, Italian, Arabic), and for two proficiency levels—medium and high. The data was annotated using the protocol in Beigman Klebanov and Flor (2013), that emphasized argumentation-relevant metaphors. Average inter-annotator agreement was $\kappa=0.56$-$0.62$, for multiple passes of the annotation. For the experiments, marked metaphor annotations were used as well as 180 essays for training and 60 essays for testing. Tables 1 and 2 show some descriptive characteristics of the data: the number of texts, sentences, tokens, and class distribution information for Verbs and AllPOS tracks for the two corpora—VUA and TOEFL.

As noted above, different machine learning models and/or model architectures can be utilized. With the current subject matter, a Bidirectional Encoder Representations from Transformers (BERT) was used. The BERT model as used herein is a transformer model that is pre-trained on a large quantity of texts. The BERT model was fine-tuned as a standard token classification task, that is, after obtaining the contextualized embeddings of a sentence, a linear layer was applied followed by softmax on each token to predict whether it is metaphorical or not. FIG. 1 is a diagram 100 illustrating a transformer-based architecture in which tokens are inputted into a series of encoders which take the different parts of input data and selectively weigh their influence. In particular, each encoder comprises a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders. The first encoder takes positional information and embeddings of the input token sequence as its input, rather than encodings.

With the model architecture of FIG. 1, the hyperparameters were tuned based on cross-validation on training data. Various fold partitions can be used for the VUA corpus and/or the TOEFL corpus. Batch size was selected in $\{16, 32, 64\}$, number of training epochs in $\{2, 3, 4, 5\}$, and a fixed learning rate of $3 \times 10^{-5}$ was used. A learning rate scheduler known as slanted triangular was also applied. Due to the imbalanced class distribution in our data (see Table 2), the positive class was up-weighted by a factor of 3. The same setting applies to experiments described in all the following sections.

TABLE 1

Number of texts and sentences for both VUA and TOEFL datasets.

| Datasets | VUA | | TOEFL | |
| --- | --- | --- | --- | --- |
| | Train | Test | Train | Test |
| #texts | 90 | 27 | 180 | 60 |
| #sents | 12,123 | 4,081 | 2,741 | 968 |

TABLE 2

Number of tokens and percentage of metaphors breakdown for both VUA and TOEFL datasets, grouped by Verbs and AllPOS.

| | Datasets | | | | | | | |
| --- | --- | --- | --- | --- | --- | --- | --- | --- |
| | VUA | | | | TOEFL | | | |
| | Verbs | | All POS | | Verbs | | All POS | |
| | Train | Test | Train | Test | Train | Test | Train | Test |
| #tokens | 17,240 | 5,873 | 72,611 | 22,196 | 7,016 | 2,301 | 26,737 | 9,014 |
| % M | 29% | — | 18% | — | 13% | — | 7% | — |

Experiment 1: Spell correction system. Proper automatic detection of lexically-anchored phenomena in text often depends on availability of correct spelling in the text. The contribution of spelling correction to other tasks has been documented previously, especially for English texts produced by non-native learners of English. Essays written by TOEFL test-takers are known to contain a considerable amount of spelling errors. To alleviate this, a state-of-the-art automatic spelling corrections system was used to correct spelling in the TOEFL dataset. Specifically, for the training partition of the TOEFL dataset, the system corrected 1553 errors in 180 essays, and 510 errors in 60 essays of the test partition.

Multi-task system. The BERT was fine-tuned on relatively small datasets, in an attempt to enrich the learning with partially relevant additional materials through a multi-task setting—adding auxiliary tasks and train the metaphor detection task with them. The auxiliary tasks are described below.

Figure 2:
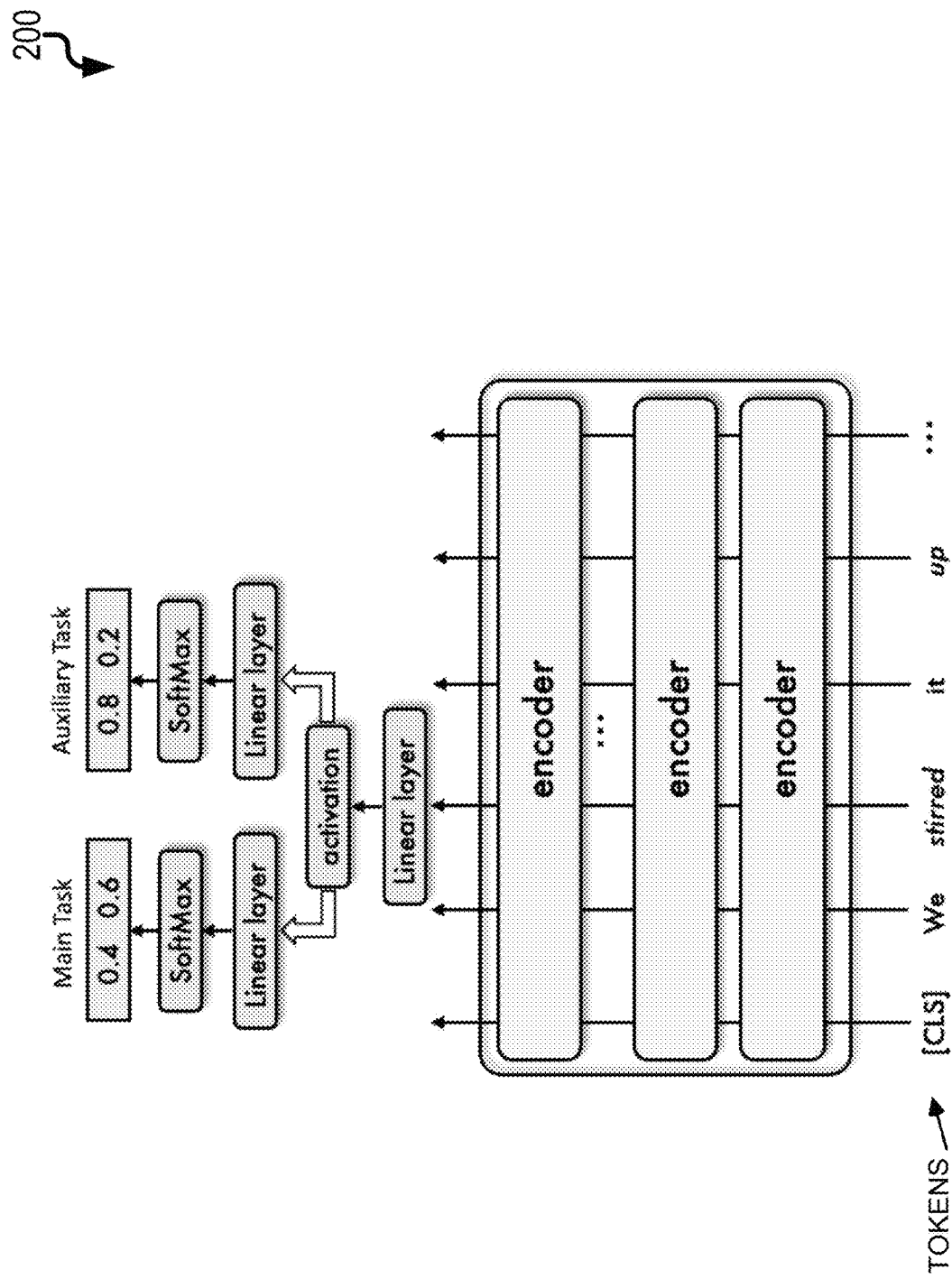
FIG. 2 is a diagram illustrating a multi-task transformer network architecture for implementing aspects of the current subject matter.

An example model used for multi-task learning is as follows: Instead of directly making predictions based on the output embeddings of BERT, the embeddings are first projected to a lower-dimensional representation by a linear layer; each task then has its own classifier on top of that linear layer. The architecture of the model is shown in diagram 200 of FIG. 2.

During training, the data in batches of the metaphor task (our main task) and the auxiliary tasks are mixed and trained on in an interleaved manner; the specifics will be described for each of the auxiliary tasks separately. In order for the main task to dominate the learning, the gradient of the auxiliary tasks can be scaled by a factor of 0.1. The hyperparameters can be selected in the same way as described above.

Various types of auxiliary tasks can be used for training purposes. In some variations, the auxiliary tasks are associated with figurative language constructs. Figurative language refers to the use of words in a way that deviates from the conventional order and meaning in order to convey a complicated meaning, colorful writing, clarity, or evocative comparison. Example, figurative language constructs include, for example, simile, metaphor, personification, onomatopoeia, oxymoron, hyperbole, allusion, idiom, imagery, symbolism, alliteration, assonance, consonance, metonymy, synecdoche, irony, sarcasm, litotes, pun, anaphora, tautology, and/or understatement.

Experiment 2: Learning from out-of-domain data. As both the VUA and the TOEFL corpora are annotated for metaphors, using one to help the other during learning could potentially provide additional relevant training data. However, since the data is from different types of texts and different genres (well-edited BNC text in academic, news, conversation and fiction genres vs relatively short English language learner essays), and since the guidelines under which the two datasets were annotated are different, it is possible that each corpus is only partially or indirectly relevant to the other. Experiments were conducted with both a straight-forward merging of the training sets of the two datasets and with a multi-task setting where the other corpus is used for the auxiliary task.

The same batch size and learning rate was used for the main task and the auxiliary task. The batches from the two tasks were interleaved uniformly; as there are roughly four times more sentences in the VUA corpus than in the TOEFL corpus, there are five batches of the VUA task following every batch of the TOEFL task.

Experiment 3: Learning from another type of figurative language. Differently from Experiment 2, where an out-of-domain dataset annotated for the same phenomenon was utilized, in Experiment 3, a different type of figurative language was utilized, namely, idioms (which have metaphorical underpinnings which have been noted in psycholinguistic literature.

One or more of the words participating in idiomatic expressions are often used metaphorically. Thus, in CUTTING EDGE both the words are used metaphorically; in PAY attention, false STEP, helping HAND, GOLDEN opportunity, and social LADDER, the capitalized word is a metaphor while the other is not. There are also idioms where none of the words are used metaphorically such as matter of fact, other than, and once in a while. Still, it appears likely that the preponderance of metaphors within idiomatic expressions would be higher than in non-idiomatic language. It is also possible that learning to detect idioms—a different but related type of figurative language—could help with metaphor detection, as these might tend to be used in similar contexts. Experiment 3 was an attempt to explore these observations by setting idiom detection as an auxiliary task for the main metaphor detection task.

Idiom detection systems are typically constrained to very small sets of idioms or to particular types of expressions (e.g. verb-noun constructions). A system was utilized that marks candidate expressions but does not verify their idiomaticity in the given context. The advantage of this particular system is that it has very wide coverage. It was assumed that many of the idioms found in a particular corpus might be well-known idioms that are listed in various dictionaries. The system was equipped with a dictionary of about 5000 English idiomatic expressions (culled from Wiktionary), and it was configured to perform a flexible search for idioms and their syntactic and lexical variants in running text (the system was configured to perform a simultaneous flexible pattern matching). The idiom detection system can look only for expressions that have more than one word, and excludes common greeting phrases (e.g. 'have a nice day'), phrasal verbs and verb+preposition constructions (unless they are part of a larger idiom). The system can mark expressions that potentially might be instances of idioms, but it does not perform idiom/non-idiom classification. The system was configured for Experiment 3 with rather conservative settings that yielded precision of 0.571 in our previous evaluations on a subset of the TOEFL data. Based on the prior evaluation, for this system configuration, most of the errors were cases where the expression was identified correctly but it was used literally rather than idiomatically.

The idiom-candidate marking system was run on TOEFL-11 essays and on the BNC corpus (excluding texts of the shared task). In total, the system detected 3,581 different idiom types in the BNC, with 179,967 instances of (candidate) idioms; in the TOEFL-11 data, 504 different idiom types were found with 3,908 instances. There is somewhat more idiom usage per sentence in the BNC than in the TOEFL data: The system identified an idiom in 3% of all BNC sentences and in 2.2% for of TOEFL-11 sentences. Table 3 shows the 20 most frequently found (candidate, or unverified) idioms in the BNC and TOEFL data; the lists contain a mix of idioms that contain and do not contain metaphors.

The idiom detection auxiliary task was also formalized as a token classification task. Given a sentence, predict for each token whether it is part of an idiom. Given the size of the BNC corpus, only a small subset of it was used for training: 10,000 sentences with idioms and 10,000 sentences without idioms. For the TOEFL-11 data, all sentences with idioms were kept and the same number (3,908) of sentences without idioms were sampled.

Results. Tables 4 and 5 show performance of the various systems on AllPOS and Verbs-only tasks, respectively, for both VUA and TOEFL data. Since it is clear that spelling correction is useful for improving performance on TOEFL data, the spell corrected version of the data was used for all the systems from experiments 2 and 3 on TOEFL data.

Since VUA data contains well-edited BNC text, spelling correction was not run on VUA data. For the Verbs tasks, experiments were conducted with both (a) training on All-POS data and evaluating on the Verbs-only subset of the test data, and (b) training and testing on Verbs only subsets. Version (a) yielded better results, which are reported here.

Discussion First, it was observed that comparative results across the different systems are highly consistent for AllPOS and Verbs-only settings; and, as such, the focus below is on AllPOS.

It was seen that combining the training data from TOEFL and VUA sets does not result in better performance on either test set (see Dali in Tables 4, 5). This could be due to both out-of-domain nature of the two corpora with respect to each other, to the difference in the guidelines under which the two corpora were annotated, and/or to the difference in the distribution of metaphors vs non-metaphors in the two corpora (see Table 2 for class distribution information).

However, when set up as a multi-task system with a shared representation, using data from VUA as part of the training process results in better performance on TOEFL test data, with a 2.6 points F1 score gain for AllPOS (0.666 vs 0.692 in Table 4). Thus, it was demonstrated that using the VUA data as part of the training process through the shared representation but without the TOEFL training process sustaining a loss for misclassifying instances from VUA (as was the case when the training sets were merged), the system successfully acquired useful information that helped boost performance on TOEFL test data.

Of note, the multi-task version of the setting for using out-of-domain data did not result in improvements on VUA test data (F1 score of 0.717 vs 0.715). The drop in recall and increase in precision observed for the $D_{mt}$ model on VUA data was consistent with the direction of the results where the two training datasets were simply merged into a bigger training dataset ($D_{all}$). It appears that under the guidelines in which TOEFL data was annotated where argumentation-relevant metaphors are detected intuitively, without recourse to a standard dictionary, the annotation outcomes are more conservative: Some instances that the system trained on VUA data considered metaphorical were not considered so in a system that was exposed to TOEFL data during training. For example, the three underlined words in the following sentence were classified as metaphors by the version that was trained on VUA data only, but were classified as non-metaphors after augmentation with the TOEFL data: "A less direct measure which is applicable only to the most senior management is to observe the fall or rise of the share price when a particular executive leaves or joins a company." Of these, senior and leaves are metaphors according to VUA ground truth, while observe is not. Overall, the drop in recall was not sufficiently offset by the increase in precision (although there is a small improvement in F1 score for the Verbs only data—from 0.756 to 0.762, see Table 5). Still, the experimental results suggest that if one is interested in a precision-focused system, using TOEFL data in a multi-task setting when training and testing on VUA could be beneficial, as $D_{mt}$ achieved the best precision on the VUA dataset among all the compared systems.

TABLE 3

Top 20 most frequently observed (unverified) idioms in the BNC and TOEFL 11 corpora.

| BNC | TOEFL 11 |
| --- | --- |
| find oneself | long time |
| other than | need-to-know |
| long time | pay attention |
| great deal | matter of fact |
| once again | other than |
| ups and downs | day-to-day |
| once more | find oneself |
| much less | long run |
| come through | stay at home |
| old woman | play games |
| bear in mind | great deal |
| cup of tea | jack of all trades |
| day-to-day | side effect |
| ask the question | much less |
| let alone | change one's mind |
| need-to-know | ask the question |
| common law | again and again |
| close one's eyes | well and good |
| blue-eyed | tell the truth |
| change one's mind | once again |

Note:
Hyphens are treated as between-word delimiters and are optionally matched. Thus, both "stay-at-home" and "day to day" will be matched, even though these are not the canonical forms of the idioms on the list.

With the experiments with an auxiliary idiom detection task, it was observed that on VUA data there was a 2-point increase in F1 score—with no penalty in precision, the system gained about 3.5 points in recall (0.713 vs 0.749 on AllPOS; 0.790 vs 0.823 on Verbs). This confirms the usefulness of attending to a related type of figurative language through an auxiliary task—even though the identification of idioms was done using an automated procedure and therefore is quite noisy.

TABLE 4

AllPOS performance.
All POS

| | VUA | | | TOEFL | | |
| --- | --- | --- | --- | --- | --- | --- |
| System | P | R | F | P | R | F |
| BL | .721 | .713 | .717 | .701 | .563 | .624 |
| Sp | — | — | — | .656 | .676 | .666 |
| $D_{all}$ | .728 | .676 | .701 | .576 | .637 | .605 |
| $D_{mt}$ | .741 | .692 | .715 | .669 | .717 | .692 |
| $I_{mt}$ | .721 | .749 | .734 | .718 | .616 | .663 |

BL = baseline BERT system;
Sp = baseline BERT system trained and tested on spell-corrected TOEFL data;
Dall = baseline BERT system trained on combined TOEFL and VUA data;
Dmt = a multi-task system using out-of-domain metaphor annotated data;
Imt = multi-task system using idiom detection as an auxiliary task.

TABLE 5

Verbs performance.
Verbs

| | VUA | | | TOEFL | | |
| --- | --- | --- | --- | --- | --- | --- |
| System | P | R | F | P | R | F |
| BL | .725 | .790 | .756 | .624 | .694 | .657 |
| Sp | — | — | — | .674 | .694 | .684 |
| $D_{all}$ | .747 | .733 | .740 | .614 | .664 | .638 |
| $D_{mt}$ | .754 | .772 | .762 | .747 | 661 | .702 |
| $I_{mt}$ | .732 | .823 | .775 | .705 | .631 | .667 |

BL = baseline BERT system;
Sp = baseline BERT system trained and tested on spell-corrected TOEFL data;
Dall = baseline BERT system trained on combined TOEFL and VUA data;
Dmt = a multi-task system using out-of-domain metaphor annotated data;
Imt = multi-task system using idiom detection as an auxiliary task.

To examine the impact of the idiom auxiliary task, one of the cross-validation folds was used as a development set. Looking at instances tagged as non-metaphor by the baseline model and as metaphor by the current model, there were two observations. First, of the 236 VUA sentences with newly tagged metaphors, only 9 sentences contained an idiom, according to the utilized idiom detection system. Thus, it does not appear to be the case that it is specifically metaphors within known idioms that the system has now learned to find. Secondly, the system learned some sentence-level characteristics of sentences that contain figurative language, in that quite often multiple words in the same sentence got tagged as metaphors: the 236 sentences contained 323 newly tagged metaphors. The most extreme case is that of 4 new words in the same sentence being tagged as metaphors (italicized): "This desire that cannot find its name (though it would dare speak, if it could) is pleasurable."

The identified metaphors can be utilized in various ways. In one variation, a graphical user interface can display some or all of the narrative text with the identified metaphors being visually distinctive from other words/aspects of the narrative text. In other variations, the identified metaphors can be used by a machine learning model. For example, features can be extracted from the identified metaphors and such features can be used to populate variables in a linear regression model, nodes of a neural network, and the like which, in turn, can score or otherwise rate/grade narrative text input into such model.

Figure 3:
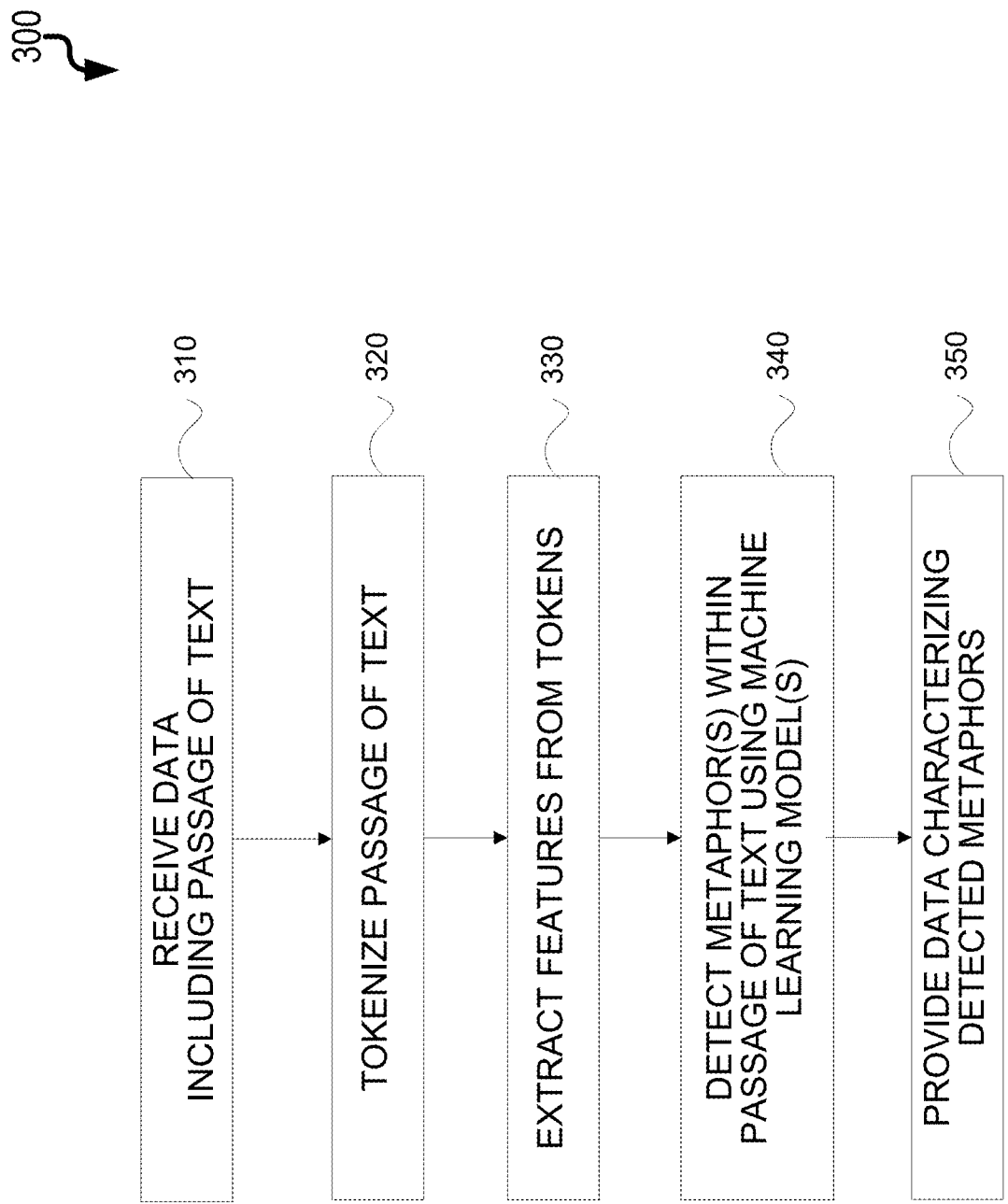
FIG. 3 is a process flow diagram illustrating machine-learning-based metaphor detection.

FIG. 3 is a diagram 300 in which, at 310, data comprising a passage of text is received. Thereafter, at 320, the passage of text is tokenized so that, at 330, features can be extracted from the tokens. Subsequently, at 340, at least one machine learning model can detect one or more metaphors within the passage of text based on the extracted features. The machine learning model can be trained, for example, by interleaving data relating to metaphors with data relating to one or more auxiliary tasks associated with related figurative language constructs Data is then provided, at 350, that identifies the detected metaphors. Provided in this context can include, as an example, displaying the data in an electronic visual display, transmitting the data to a remote computing system, storing the data in physical persistence or loading such data into memory.

Figure 4:
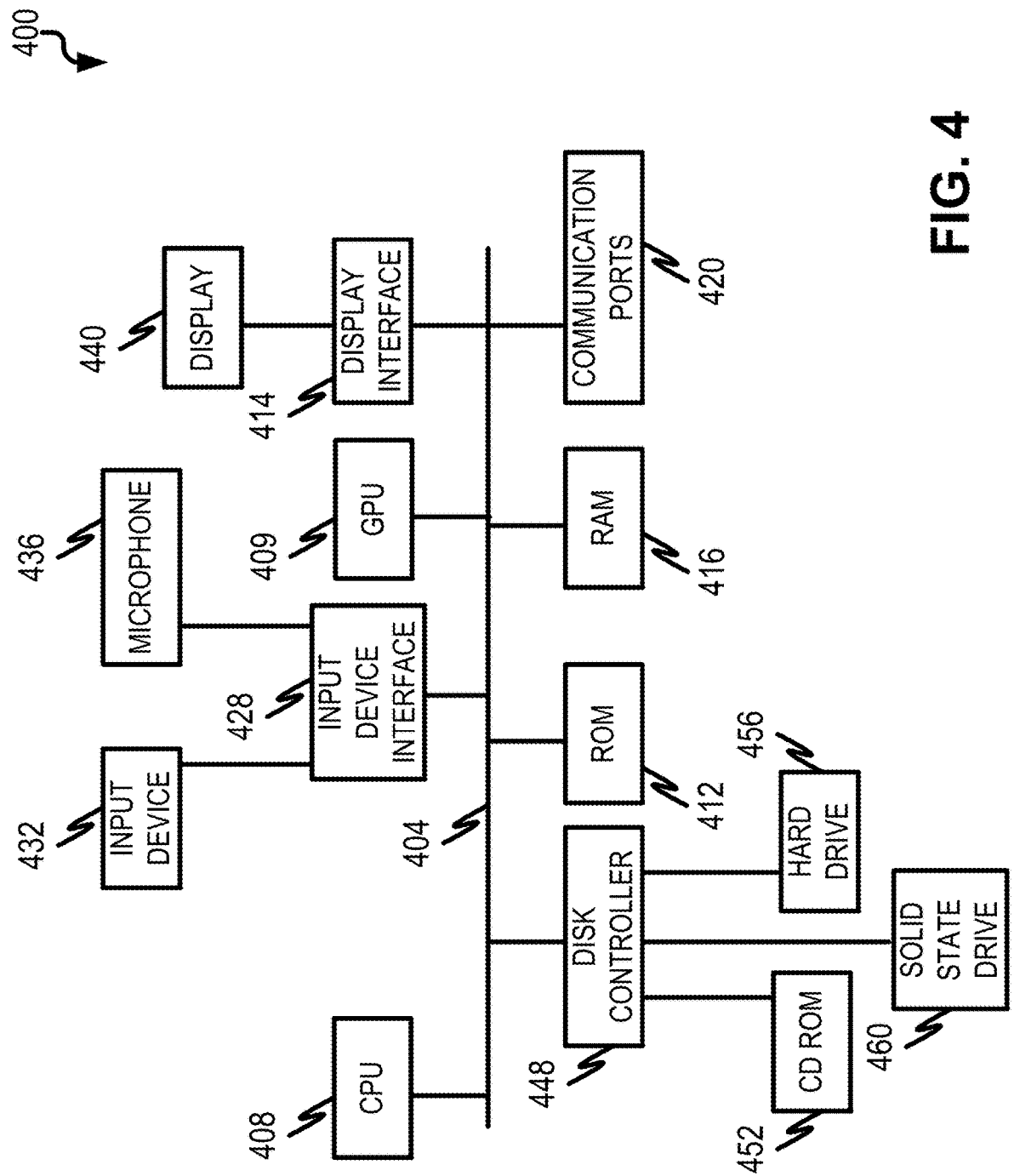
FIG. 4 is a diagram illustrating a computing device for implementing aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    receiving data comprising a passage of text;
    tokenizing the passage of text;
    extracting features from the tokens;
    detecting, by at least one machine learning model using the extracted features, one or more metaphors within the passage of text, the at least one machine learning model being trained by interleaving data relating to one or more main tasks associated with metaphor detection with data relating to one or more auxiliary tasks associated with related figurative language constructs;
    wherein the interleaving comprises mixing the data relating to the one or more main tasks with the data relating to the one or more auxiliary tasks;
    wherein the training comprises scaling a gradient of the one or more auxiliary tasks by a factor of 0.1 in order for the one or more main tasks to dominate; and
    providing data identifying the detected metaphors.

2. The method of claim 1, wherein one of the auxiliary tasks comprises idiom detection, wherein the at least one machine learning model predicts, for each token, whether it is part of a figurative language construct.

3. The method of claim 1, wherein the providing data comprises one or more of: displaying the data identifying the detected metaphors in an electronic visual display, loading the data identifying the detected metaphors in memory, storing the data identifying the detected metaphors in physical persistence, or transmitting the data identifying the detected metaphors to a remote computing system.

4. The method of claim 1, wherein the figurative language constructs characterize one or more of: simile, metaphor, personification, onomatopoeia, oxymoron, hyperbole, allusion, idiom, imagery, symbolism, alliteration, assonance, consonance, metonymy, synecdoche, irony, sarcasm, litotes, pun, anaphora, tautology, or understatement.

5. The method of claim 1, wherein the at least one machine learning model comprises a transformer model that is pre-trained on a plurality of passages of text with marked metaphors.

6. The method of claim 5, wherein the transformer model is a bidirectional encoder representations from transformers (BERT) model.

7. The method of claim 6 further comprising:
    obtaining contextual embeddings of sentences forming part of the passage of text.

8. The method of claim 7 further comprising:
    applying a linear layer on each token to predict whether it is metaphorical or not.

9. A system comprising:
    at least one data processor; and
    memory storing instructions which, when executed by the at least one data processor, result in operations comprising:
        receiving data comprising a passage of text;
        tokenizing the passage of text;
        extracting features from the tokens;
        detecting, by at least one machine learning model using the extracted features, one or more metaphors within the passage of text, the at least one machine learning model being trained by interleaving data relating to one or more main tasks associated with metaphor detection with data relating to one or more auxiliary tasks associated with related figurative language constructs;
        wherein the interleaving comprises mixing the data relating to the one or more main tasks with the data relating to the one or more auxiliary tasks;
        wherein the training comprises scaling a gradient of the one or more auxiliary tasks by a factor of 0.1 in order for the one or more main tasks to dominate; and
        providing data identifying the detected metaphors.

10. The system of claim 9, wherein the figurative language constructs characterize one or more of: simile, metaphor, personification, onomatopoeia, oxymoron, hyperbole, allusion, idiom, imagery, symbolism, alliteration, assonance, consonance, metonymy, synecdoche, irony, sarcasm, litotes, pun, anaphora, tautology, or understatement.

11. The system of claim 9, wherein one of the auxiliary tasks comprises idiom detection, wherein the at least one machine learning model predicts, for each token, whether it is part of a figurative language construct.

12. The system of claim 9, wherein the providing data comprises one or more of: displaying the data identifying the detected metaphors in an electronic visual display, loading the data identifying the detected metaphors in memory, storing the data identifying the detected metaphors in physical persistence, or transmitting the data identifying the detected metaphors to a remote computing system.

13. The system of claim 9, wherein the operations further comprise:
    obtaining contextual embeddings of sentences forming part of the passage of text.

14. The system of claim 13, wherein the operations further comprise:
    applying a linear layer on each token to predict whether it is metaphorical or not.

15. A computer-implemented method comprising:
    receiving data comprising a passage of text;
    tokenizing the passage of text;
    extracting features from the tokens;
    detecting, by at least one machine learning model using the extracted features, one or more metaphors within the passage of text, the at least one machine learning model being trained by interleaving data relating to one or more main tasks associated with metaphor detection with data relating to two or more auxiliary tasks associated with related figurative language constructs;
    wherein the interleaving comprises mixing the data relating to the one or more main tasks with the data relating to the one or more auxiliary tasks;
    wherein the training comprises scaling a gradient of the one or more auxiliary tasks by a factor of 0.1 in order for the one or more main tasks to dominate; and
    providing data identifying the detected metaphors;
    wherein the figurative language constructs characterize one or more of: simile, metaphor, personification, onomatopoeia, oxymoron, hyperbole, allusion, idiom, imagery, symbolism, alliteration, assonance, consonance, metonymy, synecdoche, irony, sarcasm, litotes, pun, anaphora, tautology, or understatement.

16. The method of claim 15, wherein the at least one machine learning model comprises a transformer model that is pre-trained on a plurality of passages of text with marked metaphors.

17. The method of claim 15, wherein the training comprises tuning hyperparameters of the at least one machine learning model, wherein the hyperparameters comprise batch size and number of training epochs.

18. The method of claim 15, wherein extracting the features comprises generating contextual embeddings of the tokens.

19. The method of claim 18 further comprising:
projecting the contextual embeddings to a lower-dimensional representation by applying a linear layer on each contextual embedding.

* * * * *